Patented Jan. 4, 1949

2,457,988

UNITED STATES PATENT OFFICE 2,457,988

PREPARATION OF P-ACETYLPHENYL ACETATE

William S. Emerson, Dayton, Ohio, assignor to Monsanto Chemical Company, St. Louis, Mo., a corporation of Delaware No Drawing. Application April 6, 1946, Serial No. 660,311

2 Claims. (Cl. 260—479)

This invention relates to the preparation of p-acetylphenyl acetate. It provides an efficient and inexpensive method whereby p-acetylphenyl acetate may be prepared from p-ethylphenyl acetate by the oxidation of the latter in the liquid phase by means of aqueous oxygen in the presence of certain catalysts hereinafter disclosed.

It is well known that phenol effectively inhibits the oxidation of hydrocarbon side chains on aromatic compounds. It is also well known that phenyl esters hydrolyze very rapidly. In view of these recognized difficulties, it was expected that the ethyl group of p-ethylphenyl acetate would be extremely difficult, if not impossible, to oxidize even by the employment of gaseous oxygen.

I have found, however, that the ethyl group of p-ethylphenyl acetate may be oxidized by air or oxygen to the acetyl group by means of a catalyst comprising a combination of chromium oxide, ($Cr_2O_3$), cobalt hydrate, ($CO(OH)_2$), and calcium carbonate, provided that the oxidizing medium is kept substantially free of liquid water. Since water is formed in the oxidation reaction, there is a natural tendency for the phenyl ester present to hydrolyze, liberating a phenol, and the tendency to such hydrolysis is accelerated by the normal oxidation catalysts usually employed for similar reactions. In order to carry out this oxidation, the reaction mixture should be maintained at a temperature above the boiling point of water under the pressure prevailing in the oxidation vessel.

The optimum composition of the catalyst which I have found effective is: chromium oxide, one part by weight; cobalt hydrate, one part by weight; calcium carbonate, eight parts by weight. This composition, however, is merely the preferred composition, since it is possible to vary the chromium oxide and cobalt hydrate ingredients over certain limits without departing from the principles of this invention. The active member of this catalyst group appears to be cobalt hydrate; however, it is desirable for the present purpose that the activity of this member be promoted by the addition of chromium oxide. Accordingly, for the most satisfactory results both of these ingredients are desirable. The catalytic activity of these two members is further increased by the presence of calcium carbonate which appears to furnish an extended surface upon which the reaction may take place.

The proportions in which the chromium oxide-cobalt hydrate mixture are employed may, as stated above, be varied over certain limits. These limits extend from about 80 parts of chromium oxide and 20 parts of cobalt hydrate to 80 parts of cobalt hydrate and 20 parts of chromium oxide, all parts being by weight. The amount of calcium carbonate employed with any of the above chromium oxide-cobalt hydrate mixture is not critical and, as a matter of fact, the calcium carbonate may be entirely omitted if desired. I have found, however, that the reaction proceeds somewhat more readily if some calcium carbonate is employed in conjunction with the above mixture.

The reaction may be carried out under reduced, under normal or under super-atmospheric pressures.

The amount of catalyst employed is not critical and may be varied over fairly wide limits. Amounts of catalyst ranging from 0.1% to 10% by weight, based on the weight of p-ethylphenyl acetate employed, will generally be found satisfactory.

The following example illustrates one method by which this invention may be practiced:

*Example*

*p-Acetylphenyl acetate.*—Oxygen was blown through an alundum disperser into 217 g. of p-ethylphenyl acetate containing 5% of a 1:1:8 mixture of chromium oxide, cobalt hydrate and calcium carbonate held at 140–145° C. for 15 hours. Water was removed by means of a Dean and Stark trap. Upon cooling, the catalyst was removed by filtration and washed with benzene. The combined filtrate and washings were refluxed for two hours with 100 cc. of acetic anhydride containing 10 g. of sodium acetate. This mixture was washed thoroughly with water and then distilled to give 222 g. (70% recovery) of p-ethylphenyl acetate, B. P. 109–124°/13 mm., $n_D^{26}$ 1.4961 and 81 g. (24% conversion, 79% yield) of p-acetylphenyl acetate, B. P. 157-162°/13 mm., (160°/22 mm.)[1].

In the above example, the oxidation product, after removal of the catalyst and after washing with benzene, may be refluxed with acetic anhydride and sodium acetate, as described in the above example. This is done solely for the purpose of making certain that no p-acetyl phenol is present in the product. Where the presence of traces of such phenol in the final product is not important, the acetylation of the oxidation product may be omitted.

What I claim is:

1. A method of preparing p-acetyl-phenyl acetate which comprises contacting p-ethyl-phenyl

---

[1] Verley, Bull. Soc. Chim., (3) 19, 140 (1898).

acetate with oxygen at a temperature above the boiling point of water in the presence of a catalyst consisting of from 80 to 20 parts by weight of chromium oxide and 20 to 80 parts of cobalt hydrate, the reaction being conducted under conditions such that the gaseous reaction products are immediately removed from the reaction zone.

2. A method of preparing p-acetyl-phenyl acetate which comprises contacting p-ethyl-phenyl acetate with oxygen at a temperature above the boiling point of water in the presence of a catalyst consisting of equal parts by weight of chromium oxide and cobalt hydrate, the reaction being conducted in the presence of calcium carbonate under conditions such that the water evolved is immediately removed from the reaction zone.

WILLIAM S. EMERSON.

REFERENCES CITED

The following references are of record in the file of this patent:

UNITED STATES PATENTS

| Number | Name | Date |
|---|---|---|
| 2,302,466 | Palmer, et al. | Nov. 17, 1942 |
| 2,376,674 | Emerson, et al. | May 22, 1945 |
| 2,390,368 | Hochwalt | Dec. 4, 1945 |